(12) United States Patent
Woolley

(10) Patent No.: US 9,436,619 B2
(45) Date of Patent: Sep. 6, 2016

(54) MULTI-LEVEL, HARDWARE-ENFORCED DOMAIN SEPARATION USING A SEPARATION KERNEL ON A MULTICORE PROCESSOR WITH A SHARED CACHE

(71) Applicant: Raytheon Company, Waltham, MA (US)

(72) Inventor: Brandon Woolley, Murphy, TX (US)

(73) Assignee: Raytheon Company, Waltham, MA (US)

( * ) Notice: Subject to any disclaimer, the term of this patent is extended or adjusted under 35 U.S.C. 154(b) by 66 days.

(21) Appl. No.: 14/480,456

(22) Filed: Sep. 8, 2014

(65) Prior Publication Data
US 2016/0070658 A1 Mar. 10, 2016

(51) Int. Cl.
| | |
|---|---|
| G06F 12/08 | (2016.01) |
| G06F 12/14 | (2006.01) |
| G06F 3/06 | (2006.01) |
| G06F 12/10 | (2016.01) |
| G06F 9/455 | (2006.01) |
| G06F 9/46 | (2006.01) |
| G06F 9/54 | (2006.01) |

(52) U.S. Cl.
CPC ......... *G06F 12/1458* (2013.01); *G06F 3/0622* (2013.01); *G06F 3/0665* (2013.01); *G06F 3/0673* (2013.01); *G06F 9/45533* (2013.01); *G06F 9/46* (2013.01); *G06F 9/468* (2013.01); *G06F 9/547* (2013.01); *G06F 12/084* (2013.01); *G06F 12/0806* (2013.01); *G06F 12/0842* (2013.01); *G06F 12/1009* (2013.01); *G06F 12/1081* (2013.01); *G06F 2212/1052* (2013.01); *G06F 2212/281* (2013.01); *G06F 2212/62* (2013.01)

(58) Field of Classification Search
CPC ............ G06F 12/084; G06F 9/45558; G06F 11/2242; G06F 12/0806; G06F 12/0842; G06F 2212/62; G06F 12/1458; G06F 2212/1052; G06F 2212/281; G06F 3/0622; G06F 3/0665
USPC ......................................... 711/130, 147, 119
See application file for complete search history.

(56) References Cited

U.S. PATENT DOCUMENTS

| | | | |
|---|---|---|---|
| 7,130,977 B1 | 10/2006 | Christie et al. | |
| 8,327,187 B1 | 12/2012 | Metcalf | |
| 9,052,993 B2 * | 6/2015 | Suzuki et al. | ...... G06F 12/0842 |
| 2010/0235598 A1 | 9/2010 | Bouvier | |
| 2014/0173600 A1 | 6/2014 | Ramakrishnan Nair | |

OTHER PUBLICATIONS

International Search Report dated Sep. 17, 2015 in connection with International Application PCT/US2015/039394; 5 pages.

(Continued)

*Primary Examiner* — Jasmine Song

(57) ABSTRACT

A separation kernel isolating memory domains within a shared system memory is executed on the cores of a multicore processor having hardware security enforcement for static virtual address mappings, to implement an efficient embedded multi-level security system. Shared caches are either disabled or constrained by the same static virtual address mappings using the hardware security enforcement available, to isolate domains accessible to select cores and reduce security risks from data co-mingling.

20 Claims, 5 Drawing Sheets

(56) References Cited

OTHER PUBLICATIONS

International Written Opinion dated Sep. 17, 2015 in connection with International Application PCT/US2015/039394; 6 pages.

VanderLeest, et al.; "A Safe & Secure Arinc 653 Hypervisor"; IEEE/AIAA 32nd Digital Avionics Systems Conference (DASC); XP032553325; Oct. 6-10, 2013; 17 pages.

* cited by examiner

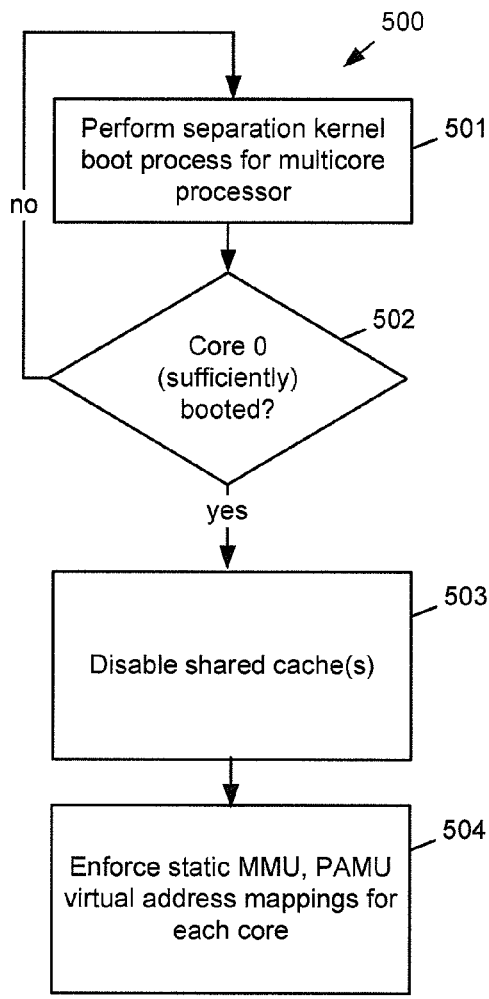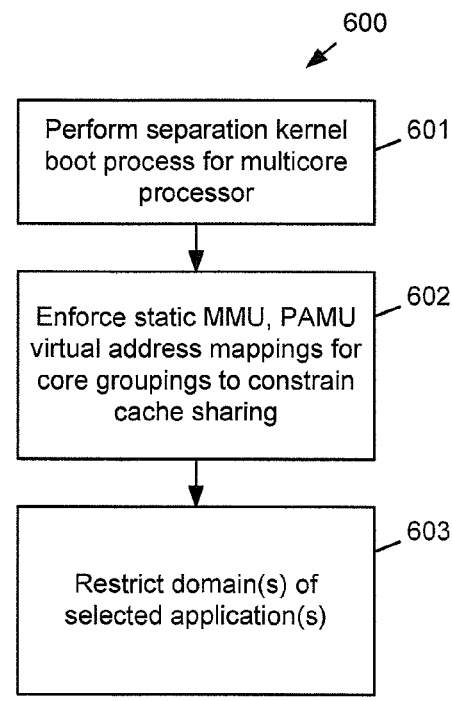
FIGURE 5
FIGURE 6

MULTI-LEVEL, HARDWARE-ENFORCED DOMAIN SEPARATION USING A SEPARATION KERNEL ON A MULTICORE PROCESSOR WITH A SHARED CACHE

TECHNICAL FIELD

The present disclosure is directed in general to multicore processor systems, and, more particularly, to multicore processor systems with at least one shared cache.

BACKGROUND OF THE DISCLOSURE

Multicore processors include multiple processing cores on the same integrated circuit die, usually with private, high-level caches also on the same die and often with a shared, lower-level cache either on the same die or in the same package. These configurations have made possible previously theoretical but impractical security attacks, such as timed thread switching and page table entry modification.

There is, therefore, a need in the art for improved data security in multicore processor systems.

SUMMARY OF THE DISCLOSURE

A separation kernel isolating memory domains within a shared system memory is executed on the cores of a multicore processor having hardware security enforcement for static virtual address mappings, to implement an efficient embedded multi-level security system. Shared caches are either disabled or constrained by the same static virtual address mappings using the hardware security enforcement available, to isolate domains accessible to select cores and reduce security risks from data co-mingling.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5 and 6 are high level flowcharts for processes of configuring core isolation and partitioning in a multicore processor with a shared cache executing a separation kernel to implement a multi-level, hardware-enforced domain separation in accordance with embodiments of the present disclosure.

DETAILED DESCRIPTION

Figure 1:
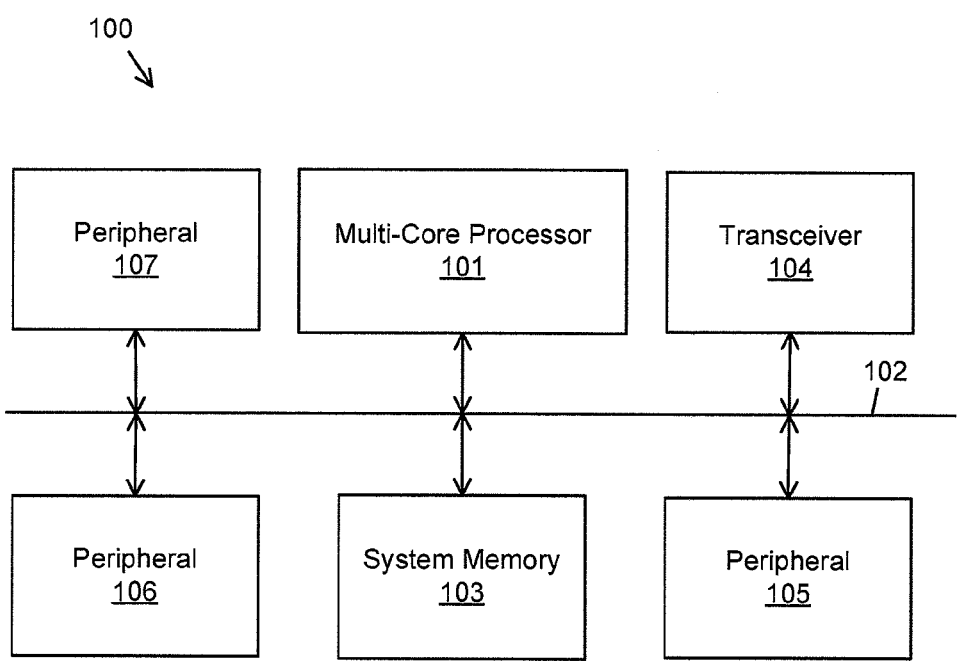
FIG. 1 is a high level block diagram of a system implementing multi-level, hardware-enforced domain separation using a separation kernel on a multicore processor with a shared cache in accordance with embodiments of the present disclosure.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Using an evaluated and approved separation kernel with hardware enforcement as foundation technologies in accordance with the present disclosure, several multi-level secure (MLS) environments running a multicore processor running in asymmetric multi-processing (AMP) mode enable an embedded multicore computer system to support at least two security domains. Based on a Freescale QorIQ system-on-a-chip (SoC) and the built-in QorIQ Trust Architecture, together with an approved separation kernel, co-mingling of data for different security level processing can be prevented. Accordingly, by organizing the processing cores to take advantage of available hardware enforcement technologies, an efficient embedded MLS system may be implemented on a multicore processor system.

FIG. 1 is a high level block diagram of a system implementing multi-level, hardware-enforced domain separation using a separation kernel on a multicore processor with a shared cache in accordance with embodiments of the present disclosure. The system 100 includes a multicore processor 101, which in the exemplary embodiment is one of the QorIQ family of multicore processors available from Freescale Semiconductor, Inc., such as the model P4080 processor. The multicore processor 101 is communicably coupled by a system bus 102 to a system memory 103, and, in the exemplary embodiment, also to a transceiver 104 and to a plurality of peripheral devices 105, 106 and 107. The system may be implemented, for example, as part of an unmanned aerial vehicle (UAV), an infrared imaging satellite, or a missile system. Those skilled in the art will recognize that the full structure and operation of the system 100 is not depicted by the drawings or described herein. Instead, for simplicity and clarity, only so much of the system 100 as is either unique to the present disclosure or necessary for an understanding of the present disclosure is depicted and described.

Figure 2:
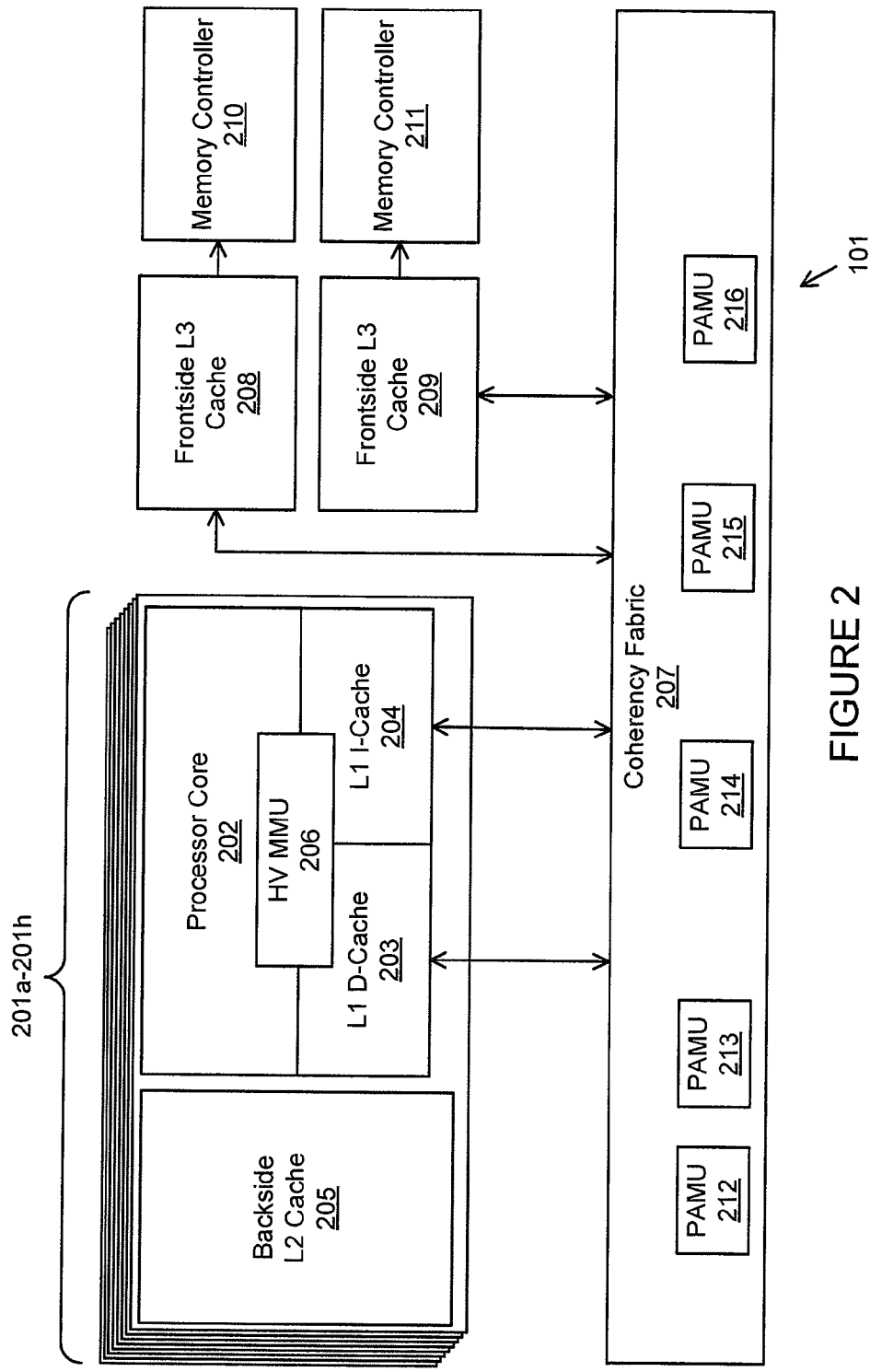
FIG. 2 is a high level block diagram of a multicore processor with a shared cache that may be employed to implement multi-level, hardware-enforced domain separation using a separation kernel in accordance with embodiments of the present disclosure.

FIG. 2 is a high level block diagram of a multicore processor with a shared cache that may be employed to implement multi-level, hardware-enforced domain separation using a separation kernel in accordance with embodiments of the present disclosure. As noted above, the multicore processor 101 is preferably a Freescale QorIQ processor, although any multiprocessor with the security features described herein may be employed instead. Multicore processor 101 includes a plurality of processors. In the exemplary embodiment, eight processors 201a-201h, named "core 0" to "core 7," are formed in the integrated circuit of multicore processor 101. Each processor 201a-201h includes a processing core 202, the circuitry executing instructions of a program. Each processor also includes a level one (L1) data cache ("D-Cache") 203 and an L1 instruction cache ("I-Cache") 204, each 32 kilobytes (KB) in size and each holding working copies of data and program instructions, respectively, for operations executed within the respective processor 202. Each processor 202 also includes a level two (L2) backside cache 205 (e.g., 128 KB), a combined data and instruction cache.

One of the hardware enforcement mechanisms within the multicore processor 101 of the exemplary embodiment is a memory management unit (MMU), which in the exemplary embodiment is implemented by a hardware virtualization memory management unit (HV MMU) 206. The HV MMU 206 performs, in hardware, virtualization of memory addresses for locations within system memory. That is, ranges of virtual memory addresses defined for use by software operating within the processor 201a (or 201b, 201c, etc.) map to physical memory locations. The mapping and subsequent address translations are controlled by HV MMU 206, which is employed at least during read or write accesses to system memory and which operates cooperatively for cache control and, to the extent necessary, bus arbitration.

The two L1 caches 203 and 204 are communicably coupled to a coherency fabric 207, which in the example of a QorIQ processor is implemented by the CoreNet coherency fabric. Front side level three (L3) caches 208 and 209 (e.g., 1024 KB) are also communicably coupled to coherency fabric 207, and are each coupled to a respective memory controller 210 and 211. When used, the L3 caches 208 and 209 are shared by processors 201a-201h, and thus each can contain data for software executing within different ones of those processors. While applications executing in the processors 201a-201h may be designed to operate exclusively within respective memory address ranges, the co-mingling of data within a shared cache presents potential opportunities for security attacks.

The coherency fabric 207 manages coherency of the caches 203, 204 and 205 for each processor 201a-201h and of shared caches 208 and 209 with each other and with system memory (not shown). The coherency fabric 207 also provides scalable on-chip, point-to-point connectivity supporting concurrent traffic to and from multiple resources connected to the fabric 207, eliminating single-point bottlenecks for non-competing resources and thus avoiding various bus contention and latency issues associated with scaling shared bus/shared memory architectures. The coherency fabric 207 is connected with communications resources (not shown), such as Ethernet frame managers/buffers and input/output (I/O) ports according to various other communications standards with test/debug interfaces (also not shown), and/or with security engines and managers (also not shown). Again, those skilled in the art will recognize that the full structure and operation of the multicore processor 101 is not depicted by the drawings or described herein. Instead, for simplicity and clarity, only so much of the multicore processor 101 as is either unique to the present disclosure or necessary for an understanding of the present disclosure is depicted and described.

Another hardware enforcement mechanism within the multicore processor 101 of the exemplary embodiment is the peripheral access management units (PAMUs) 212, 213, 214, 215 and 216 within the coherency fabric 207. The PAMUs 212-216 serve as the input/output (I/O) MMUs for the multicore processor 101, providing I/O device-to-memory access control, protection and address translation in a manner allowing creation of a securely partitioned system. While the PAMUs 212-216 may grant direct memory access (DMA) to peripherals, the multicore processor 101 may be configured so that all DMA-capable I/O devices must go through one of the PAMUs for memory accesses, with the respective PAMU employing a set of software-configured tables to determine what physical address ranges the device is permitted to access.

Figure 3:
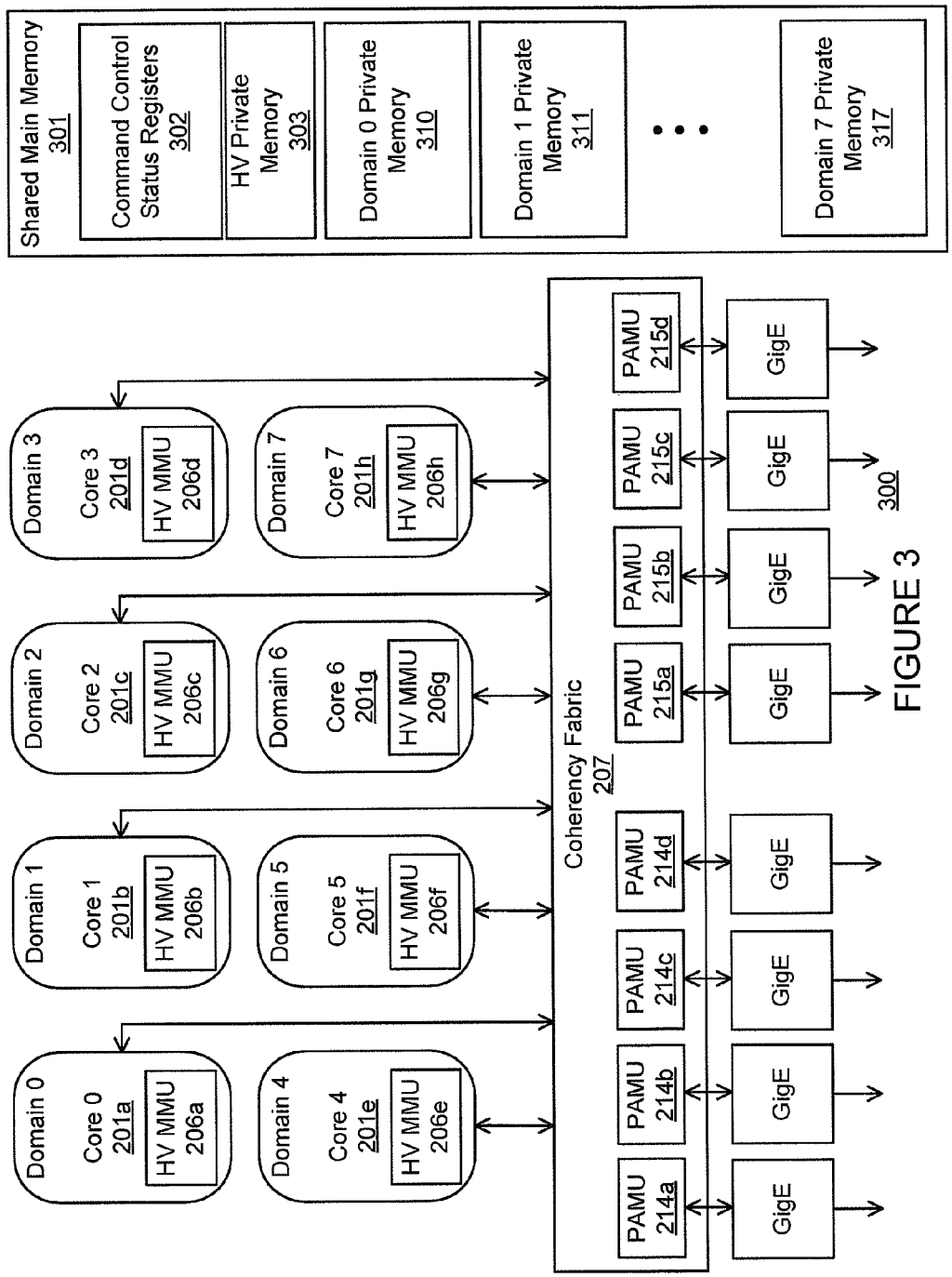
FIG. 3 diagrammatically illustrates one core isolation and partitioning configuration of a multicore processor with a shared cache that may be realized with a separation kernel to implement a multi-level, hardware-enforced domain separation in accordance with embodiments of the present disclosure.

FIG. 3 diagrammatically illustrates one core isolation and partitioning configuration of a multicore processor with a shared cache that may be realized with a separation kernel to implement a multi-level, hardware-enforced domain separation in accordance with embodiments of the present disclosure. The configuration 300 employs all processors 201a-201h of the exemplary multi-core processor of FIG. 2, together with the respective HV MMUs 206a-206h and PAMUs 214-215. In this configuration 300, each of the processors 201a-201h executes a separation kernel and the L3 caches 208-209 are disabled (not utilized). A "separation kernel" is an operating system security kernel used to create an environment that is indistinguishable from physically distributed systems; that is, each domain appears to all other domains as a separate, isolated machine and information flow between domains is limited to known, external communication lines. The characteristics of a separation kernel are defined, for example, by the Separation Kernel Protection Profile (SKPP) promulgated by the Information Assurance Directorate of the U.S. National Security Agency (NSA), and enterprises may seek evaluation and approval of products through the National Information Assurance Partnership (NIAP). Examples of approved, commercially available separation kernels include INTEGRITY-178B from Green Hills Software and VxWorks MILS from Wind River. It should be noted that embedded hypervisors and similar resources found in many multicore processor designs may support implementation of separation kernels, but typically do not, taken alone, meet the requirements for a separation kernel.

In the embodiment of FIG. 3, each processor 201a-201h is a separate domain (domain 0 through domain 7). Each processor 201a-201h executes a separation kernel to enforce static MMU and PAMU mappings in the MMUs 206a-206h and PAMUs 214-215. As a result, PAMUs 214-215 effectively become logically separate PAMUs 214a-214d and 215a-215d for each (for example) 1 Gigabyte Ethernet ("GigE") communication resource coupled via the coherency fabric 207. In addition, the shared main memory 301 of the system 100 is partitioned by the separation kernel into command, control and status registers 302, a hardware virtualization private memory 303, and separate private memories 310 through 317 for each of the separate domains. Because the L3 caches have been disabled and are unused, data co-mingling at that cache level no longer poses a security risk, at a performance penalty that is acceptable for the improved security.

Figure 4:
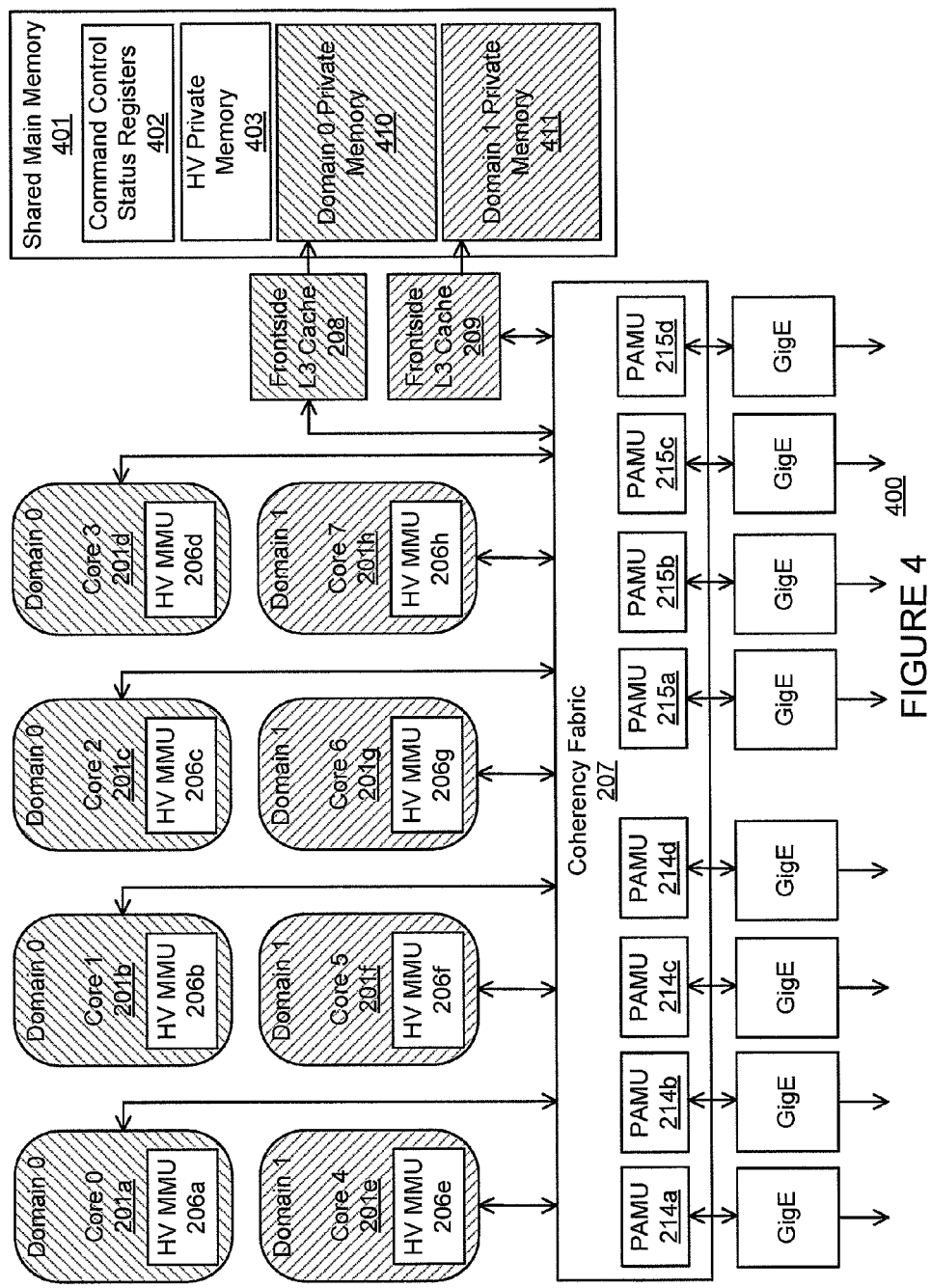
FIG. 4 diagrammatically illustrates another core isolation and partitioning configuration of a multicore processor with a shared cache that may be realized with a separation kernel to implement a multi-level, hardware-enforced domain separation in accordance with embodiments of the present disclosure.

FIG. 4 diagrammatically illustrates another core isolation and partitioning configuration of a multicore processor with a shared cache that may be realized with a separation kernel to implement a multi-level, hardware-enforced domain separation in accordance with embodiments of the present disclosure. The configuration 400 employs all processors 201a-201h of the exemplary multi-core processor of FIG. 2, together with the respective HV MMUs 206a-206h and PAMUs 214-215. In this configuration 400, each of the processors 201a-201h executes a separation kernel and the L3 caches 208-209 are enabled. In this embodiment, however, the processors 201*a*-201*h* are divided into two separate domains (domain 0 and domain 1), with each domain using a separate L3 cache. As above, each processor 201*a*-201*h* executes a separation kernel to enforce static MMU and PAMU mappings in the MMUs 206*a*-206*h* and PAMUs 214*a*-214*d* and 215*a*-215*d*. In addition, the shared main memory 401 of the system 100 is partitioned by the separation kernel, as above, into command, control and status registers 402, and a hardware virtualization private memory 403. On the other hand, only two partitions are necessary as separate private memories 410 and 411 for the two separate domains. In the resulting organization, one L3 cache 208 is used exclusively by one set of processors (201*a*-201*d*, in the example depicted), while a separate L3 cache 209 is used exclusively for the remaining processors (201*e*-201*h*, in this example). Of course, the processors 201*a*-201*h* need not be divided equally between the two domains, and the sizes of domain private memories 410-411 need not be equal, as in the example depicted and described. Because the L3 caches are each only used within one domain, the security risk of data co-mingling at the L3 cache level can be controlled by assigning either only one application or only trusted applications to execute within one domain, while all other applications execute in the other domain.

FIGS. 5 and 6 are high level flowcharts for processes of configuring core isolation and partitioning in a multicore processor with a shared cache executing a separation kernel to implement a multi-level, hardware-enforced domain separation in accordance with embodiments of the present disclosure. While each process flow and/or event sequence depicted in the figures and described involves a sequence of steps and/or events, occurring either in series or in tandem, unless explicitly stated or otherwise self-evident (e.g., a signal cannot be received before being transmitted), no inference should be drawn regarding specific order of performance of steps or occurrence of events, performance of steps or portions thereof or occurrence of events serially rather than concurrently or in an overlapping manner, or performance the steps or occurrence of the events depicted exclusively without the occurrence of intervening or intermediate steps or events. Moreover, those skilled in the art will recognize that complete processes and event sequences are not illustrated or described. Instead, for simplicity and clarity, only so much of the respective processes and event sequences as is unique to the present disclosure or necessary for an understanding of the present disclosure is depicted and described.

The process 500 illustrated by FIG. 5 begins with performance of the boot process for a separation kernel within a multicore processor (step 501). Typically the boot process for a multicore processor begins with booting one of the cores, core 0 in this example, to a point of functionality allowing that core to set certain configuration parameters for the entire multicore processor (i.e., enforced on all cores). Accordingly, once the primary core has been sufficiently booted (step 502), any shared caches within the memory hierarchy are disabled (step 503). In the example of FIG. 2, both shared L3 caches 208-209 are disabled. In other embodiments, however, there may be additional caches at other levels (e.g., below L3) between the processors and shared system memory that are shared, or caches at other levels that are shared between processors (e.g., a shared L2 cache). Shared caches are disabled, but private caches (such as caches 203-205 in the example of FIG. 2) remain enabled and are utilized together with shared system memory. With shared caches disabled, security attacks based on data co-mingling within such caches are precluded. Within the shared system memory, the enforcement of static MMU and PAMU virtual address mappings by the separation kernel (step 504) creates isolated domains (one for each core, in this example), minimizing opportunities for security attacks based on data co-mingling.

The process 600 illustrated by FIG. 6 also begins with performance of the boot process for a separation kernel within a multicore processor (step 601). Rather than disabling shared caches, however, the enforcement of static MMU and PAMU virtual address mappings by the separation kernel (step 602) is performed by taking into consideration the architecture of the shared cache(s) and the cores, so that only selected processors access a particular shared cache. For an architecture with two shared caches at a given level, half of the cores may be restricted to using one of the shared caches and the remaining cores to using the other, as in the example described above. Alternatively, as few as one core may be permitted to use one cache by the enforced static MMU and PAMU mappings, with the remaining cores allowed only to use other cache(s). This effective extension of the separation kernel's private memory domains from system memory up into the shared caches creates at least two isolated domains. When the domain of a selected security-sensitive application is restricted (step 603), to the exclusion of other applications that are either untrusted or for which data co-mingling is deemed a security risk not worth the available performance gains, opportunities for security attacks based on data co-mingling are minimized.

It will be noted by those skilled in the art that the techniques of FIGS. 5 and 6 are not actually mutually exclusive with respect to use or non-use of available shared caches. For architectures in which use of a shared cache may be enabled or disabled on a core-by-core basis, for example, use of shared caches may be selectively disabled for certain processing cores while static MMU/PAMU mappings are enforced to both isolate domains within shared system memory and extend such isolation to nominally shared caches. For a system executing one security and latency sensitive application and a plurality of applications for which the latency without caching is acceptable, use of a shared cache may be disabled for all but one core, which executes only the security and latency sensitive application (all other applications restricted to other cores).

A multicore processor having hardware security enforcement may be employed to implement an efficient embedded MLS system by executing a separation kernel on the processing cores and organizing the processing cores to take advantage of the available hardware enforcement technologies. In particular, the selective disabling of shared caches and/or extension of domain isolation imposed by the separation kernel from shared system memory up into any shared (and enabled) caches reduces security risks from data co-mingling.

Using an evaluated and approved separation kernel with hardware enforcement as foundation technologies in accordance with the present disclosure, several multi-level secure (MLS) environments running a multicore processor running in asymmetric multi-processor (AMP) mode enable an embedded multicore computer system to support at least two security domains. Based on a Freescale QorIQ system-on-a-chip (SoC) and the built-in QorIQ Trust Architecture, together with an approved separation kernel, co-mingling of data for different security level processing can be prevented.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. §112(f) unless the words "means for" or "step for" are explicitly used in the particular claim.

What is claimed is:

1. An apparatus, comprising:
   a multicore processor including a plurality of processing cores, a plurality of memory management units, and a plurality of peripheral access management units, each of the processing cores configured to operate exclusively with only one of the memory management units and each of the processing cores configured to operate with one or more of the peripheral access management units;
   a first cache and a second cache each configured to be shared by at least two of the processing cores; and
   a separation kernel configured to execute within each of the plurality of processing cores, the separation kernel configured to enforce static virtual address mappings that form at least two isolated memory domains within a shared system memory and the first and second shared caches,
   wherein two or more of the processing cores including a first processing core and excluding a second processing core are configured to employ the first shared cache, and
   wherein two or more of the processing cores including the second processing core and excluding the first processing core are configured to employ the second shared cache.

2. The apparatus according to claim 1, wherein the apparatus is configured to operate at least the first processing core with one of the at least two isolated memory domains, to separately operate at least the second processing core with another of the at least two isolated memory domains, and to enforce the static virtual address mappings.

3. The apparatus according to claim 2, wherein each of the first processing core and third, fourth and fifth of the processing cores is configured to operate with the one of the at least two isolated memory domains and each of the second processing core and sixth, seventh and eighth of the processing cores is configured to operate with the other of the at least two isolated memory domains.

4. The apparatus according to claim 1, wherein the apparatus is configured to isolate the at least two isolated memory domains by enforcing the static virtual address mappings such that the first processing core employs a first portion of the shared system memory and the second processing core employs a second portion of the shared system memory.

5. The apparatus according to claim 1, wherein the memory management units are hardware virtualization memory management units configured to implement hardware virtualization of physical memory addresses.

6. The apparatus according to claim 1, wherein the memory management units and the peripheral access management units are configured to enforce the static virtual address mappings.

7. An apparatus, comprising:
   a multicore processor including a plurality of processing cores, a plurality of memory management units, and a plurality of peripheral access management units, each of the processing cores configured to operate exclusively with only one of the memory management units and each of the processing cores configured to operate with one or more of the peripheral access management units;
   a first cache and a second cache each configured to be shared by at least two of the processing cores; and
   a separation kernel configured to execute within each of the plurality of processing cores, the separation kernel configured to enforce static virtual address mappings that form at least two isolated memory domains within a shared system memory and the first and second caches,
   wherein the apparatus is configured to isolate the at least two isolated memory domains by enforcing the static virtual address mappings such that:
      a first of the processing cores operates with one of the at least two isolated memory domains, and
      a second of the processing cores separately operates with another of the at least two isolated memory domains,
   wherein two or more of the processing cores including the first processing core and excluding the second processing core are configured to employ the first shared cache, and
   wherein two or more of the processing cores including the second processing core and excluding the first processing core are configured to employ the second shared cache.

8. A method, comprising:
   operating each of a plurality of processing cores within a multicore processor exclusively with only one of a plurality of memory management units and with one or more of a plurality of peripheral access management units;
   selectively sharing each of a first cache and a second cache by at least two of the processing cores;
   executing a separation kernel within each of the plurality of processing cores, the separation kernel configured to enforce static virtual address mappings that form at least two isolated domains within a shared system memory and the first and second shared caches;
   employing the first shared cache for two or more of the processing cores including a first processing core and excluding a second processing core; and
   employing the second shared cache for two or more of the processing cores including the second processing core and excluding the first processing core.

9. The method according to claim 8, further comprising:
   operating at least the first processing core with one of the at least two isolated memory domains;
   operating at least the second processing core with another of the at least two isolated memory domains; and
   enforcing the static virtual address mappings for the shared system memory.

10. The method according to claim 9, wherein each of the first processing core and third, fourth and fifth of the processing cores operates with the one of the at least two isolated memory domains and each of the second processing core and sixth, seventh and eighth of the processing cores operates with the other of the at least two isolated memory domains.

11. The method according to claim 8, further comprising:
operating at least the first processing core with a first portion of the shared system memory; and
operating at least the second processing core with a second portion of the shared system memory.

12. The method according to claim 8, further comprising:
restricting the first shared cache to operating exclusively with a first of the at least two isolated memory domains and the second cache to operating exclusively with a second of the at least two isolated memory domains.

13. The method according to claim 8, wherein the memory management units are hardware virtualization memory management units implementing hardware virtualization of physical memory addresses.

14. The method according to claim 8, further comprising:
enforcing the static virtual address mappings using the memory management units and the peripheral access management units.

15. An apparatus, comprising:
a multicore processor including a plurality of processing cores each associated with a memory management unit and one or more peripheral access management units, the memory management units and the peripheral access management units each configured to selectively enforce static virtual address mappings;
a first cache and a second cache each shared by at least two of the processing cores; and
a separation kernel configured to execute within each of the plurality of processing cores, the separation kernel configured to cause the memory management units and the peripheral access management units to enforce the static virtual address mappings to form at least two isolated memory domains within a shared system memory and the first and second shared caches,
wherein the apparatus is configured to operate at least a first of the processing cores with a first of the at least two isolated memory domains exclusive of a second of the at least two isolated memory domains, and to separately operate at least a second of the processing cores with the second of the at least two isolated memory domains exclusive of the first of the at least two isolated memory domains,
wherein two or more of the processing cores including the first processing core and excluding the second processing core are configured to employ the first shared cache, and
wherein two or more of the processing cores including the second processing core and excluding the first processing core are configured to employ the second shared cache.

16. The apparatus according to claim 15, wherein the apparatus is configured to disable the caches.

17. The apparatus according to claim 16, wherein each of the first processing core and third fourth and fifth of the processing cores is configured to operate exclusively with the first of the at least two isolated memory domains and each of the second processing core and sixth, seventh and eighth of the processing cores is configured to operate exclusively with the second of the at least two isolated memory domains.

18. The apparatus according to claim 15, wherein the apparatus is configured to restrict a first physical shared cache forming the first shared cache to operate exclusively with the first of the at least two isolated memory domains and a second physical shared cache forming the second shared cache to operate exclusively with the second of the at least two isolated memory domains.

19. The apparatus according to claim 15, wherein the apparatus is configured to operate at least the first processing core with a first portion of the shared system memory and to separately operate at least the second processing core with a second portion of the shared system memory.

20. The apparatus according to claim 15, wherein the memory management units are hardware virtualization memory management units configured to implement hardware virtualization of physical memory addresses.

* * * * *